March 3, 1970     M. J. BERGER     3,498,642
PIPE FITTING
Filed Nov. 6, 1967
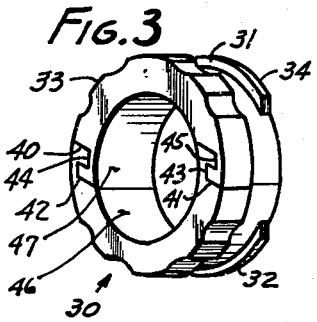
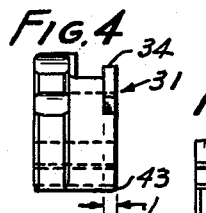
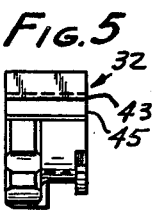
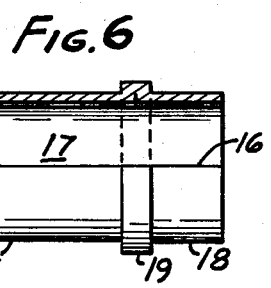
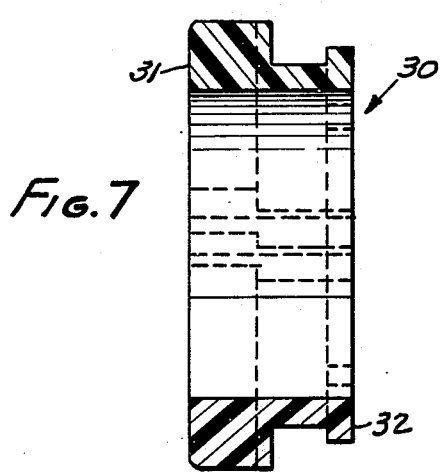
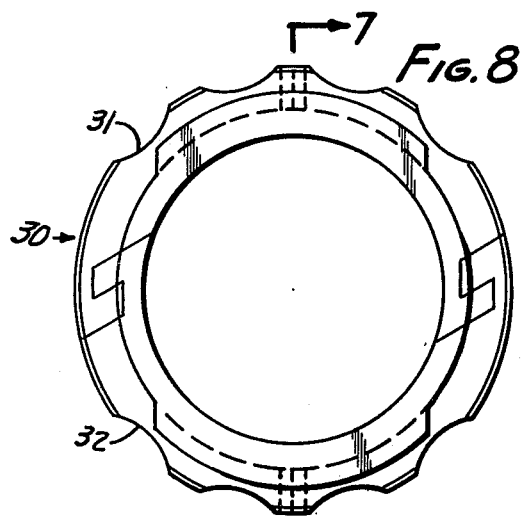
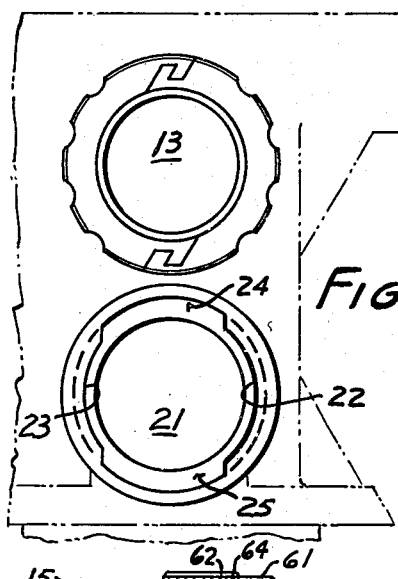
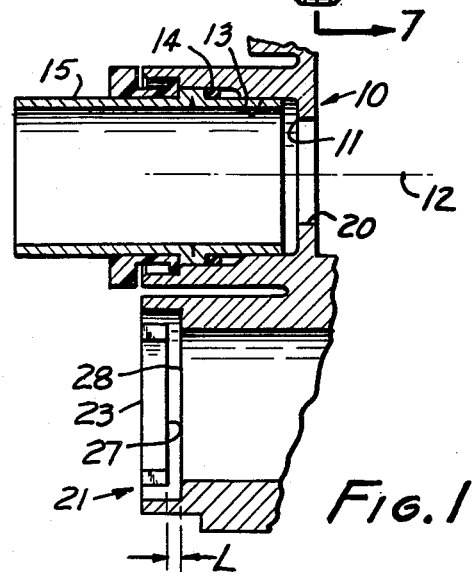
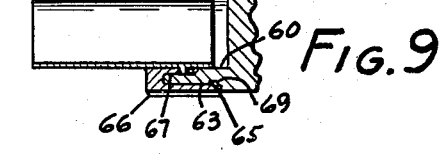
INVENTOR.
MARION J. BERGER
BY
ATTORNEYS.

United States Patent Office 3,498,642
Patented Mar. 3, 1970

3,498,642
PIPE FITTING
Marion J. Berger, Sepulveda, Calif., assignor to Schurz Controls Corporation, Los Angeles, Calif., a corporation of California
Filed Nov. 6, 1967, Ser. No. 680,640
Int. Cl. F16l 21/06, 47/00
U.S. Cl. 285—189                          6 Claims

ABSTRACT OF THE DISCLOSURE

This invention relates to a fitting for connecting a pipe to a body so that the passage in the pipe and a port in the body are in fluid communication with one another, and to the joint formed thereby. The fitting includes a ring which is made up of a plurality of segments which can be joined together by a relative axial motion. This enables a plastic ring to be utilized in connection with a flange on the pipe, which flange must be created by heat or by forces, either of which would be deleterious to the material of which the ring and its segments are made.

---

This invention relates to pipe fittings and in particular to a pipe fitting wherein a ring for attaching a pipe to a port in a body can be assembled onto the pipe after the pipe has had a flange formed on it by a mechanical process with or without heat, and to the joint formed by these devices.

It is customary in pipe fittings to hold a pipe to a body by utilizing a bayonet pipe coupling or other devices wherein a shoulder or a flange is formed on a pipe by means such as upsetting a portion of the wall while heated or by utilizing even stronger forces with the pipe cold. The foregoing involves two problems. The first is that should the ring be made of plastic, this material is not compatible with the temperatures and forces utilized. The second is that the pipe might have to be made longer than desired in order to enable these operations to be carried out with a ring already on the pipe.

It is an object of this invention to provide a ring for a fitting of this class which is comprised of a group of segments that can be assembled by relative axial movement of the segments after all other operations are completed and which requires that there be available only an initial total length of pipe equal to twice the thickness of the assembled ring, plus a small allowance for shrinkage which occurs during the upsetting operation. The final length is only twice that of the thickness of the assembled ring.

This invention is carried out in combination with a pipe that has an exterior abutment by which it is held in a port disposed in a body. The port includes a plurality of shoulders which are angularly spaced apart from each other around the axis, these shoulders having a rear wall which faces axially toward the body and which rear walls are accessible through the angular spacing between the shoulders. A plurality of ring segments is adapted to be assembled to form a complete ring having an axis. Each segment bears at both of its angularly separated edges an axially-extending tongue and groove, which tongue and groove have a radial component. These segments are assembled by angularly aligning respective tongues and grooves with the segments laying against the pipe and then relatively axially shifting the segments so the tongues enter the respective grooves. Each segment bears a shoulder of angular extent no greater than the spacing between the shoulders on the body, whereby the assembled ring segments may be brought against the pipe, the shoulders of the segments passed through said spacings, and the assembled ring rotated so its shoulders engage and are axially restrained by the rear wall, thereby holding the pipe to the body.

According to another feature of this invention, the tongues include a radial component directed toward the respective segment.

According to still another preferred but optional feature of the invention, the ring consists of two segments, the segments being identical to each other.

The above and other features of this invention will be fully understood from the following detailed description and the accompanying drawings, in which:

FIG. 1 is a side elevation partly in cutaway cross-section showing the presently preferred embodiment of the invention;

FIG. 2 is a left-hand elevation of FIG. 1;

FIG. 3 is a perspective view of a portion of the invention;

FIGS. 4 and 5 are elevations of portions of the device of FIG. 3;

FIG. 6 is a side elevation partly in axial cutaway cross-section of a portion of FIG. 1;

FIG. 7 is an axial cross-section of the device of FIG. 3, taken at line 7—7 of FIG. 8;

FIG. 8 is a left-hand elevation of FIG. 7; and

FIG. 9 is a side elevation of a reversal of parts in this invention.

The presently preferred embodiment of the invention is shown in FIG. 1 and includes a body 10 such as the body of a water softener valve that includes a port 11 having an axis 12. The port has a port wall 13 which extends axially and is adapted to receive and be borne against by a peripheral seal 14 such as a squeezed O-ring.

The object of this invention is to hold a pipe 15 (FIG. 6) having an axis 16 and an axial passage 17 to the body, connecting the passage to the port. The pipe has an outer wall 18 which serves to compress the seal against the port wall. The pipe also has an exterior flange 19 which extends around the pipe that can be formed by means such as sweating the pipe or manually upsetting it, or both, so as to form a bulge. This bulge forms a means whereby the pipe may be restrained in the port, and the peripheral seal completes the closure between the body and the exterior of the pipe. The pipe is now in fluid communication with the port and thereby with a passage 20 in the body.

Means is provided to hold the pipe to the body utilizing the exterior flange 19. For purposes of illustration, the port 11 is duplicated as port 21 in the lower portion of FIGS. 1 and 2. There it is shown that in the port wall there is formed a pair of shoulders 22, 23 which are axially aligned and angularly spaced from each other by spacings 24, 25. Each of these shoulders has a rear wall 27 which faces into the port and which is spaced from a restraint surface 28 by a distance L. Only the rear wall of shoulder 23 is shown in the figures. The rear wall of shoulder 22 is the mirror image of the wall of shoulder 23.

A ring 30 is formed of two segments 31 and 32. Because the segments are identical, only segment 31 will be described in detail. However, both are shown in FIGS. 4 and 5, respectively, to illustrate the identity of the two, and the means whereby they are joined. Ring 30 includes a crenellated surface 33 to form a hand grip and a shoulder 34 which has an angular subtense that is no greater than the angular subtense of spacings 24 or 25. It also has a thickness L which may be equal to, but is not greater than, the dimension L adjacent to restraint surface 28 (see FIG. 1).

Each segment has a pair of angularly spaced edges 40, 41 which include tongues 42, 43 and grooves 44, 45. These tongues and grooves have a radial component and at least one of them is directed back toward its respective segment. This is to say that although the invention comprehends tongues and grooves which are radially oriented, the preferred embodiment is as best shown in FIG. 8, wherein there is an angular relationship relative to a radial line which gives a more positive lock between the two when they are engaged. These tongues and grooves extend the full axial length of both of the segments and extend axially.

FIG. 9 shows a reversal of parts from the device of FIG. 1. In this embodiment, pipe 15 is fitted into port 60 in body 61, the port being formed in a tubular projection with an exterior set of shoulders 62, 63 separated by spacings (not shown) which are generally similar to those of FIG. 1. These shoulders have rear walls 64, 65.

A ring 66 is formed of two segments in the same manner as that of FIG. 1. It includes an internal abutment 67 to bear against the exterior flange of the pipe, and a pair of shoulders 68, 69 adapted to pass through the spacings and, upon rotation, to bear against the rear walls 64, 65.

This embodiment differs from that of FIG. 1 in that the shoulders on the ring are internal, instead of external, and those on the body are external instead of internal. Otherwise the constructions are the same, and their use is identical.

The assembly of this device should be evident from the foregoing. First, in either embodiment, the pipe is prepared with its external flange, and the body is prepared with its shoulders. The two segments are then laid with their arcuate portions 46, 47 against the exterior portion of the pipe, and they are axially spaced from each other by the thickness of one of the segments. These overlap because both segments extend for more than a total of 180°, although each makes up one-half of the total periphery. Then the segments are moved axially relative to one another, sliding over each other to reach the condition shown in FIGS. 7–9. This ring is now in place over a tube which might previously have been heated to red-hot temperatures in order to form the external shoulder but which, now that the pipe is cool, is compatible with a plastic ring, a material such as Delrin being an example. Furthermore, this pipe need be no longer than double the length of the ring for it to be assembled, and therefore requires only a moderate length of a tubing which ordinarily would be provided in the ordinary course of manufacture, especially when pipe bends are present.

Once the ring is formed, the peripheral seal is placed over the pipe, and the pipe is inserted into the port. Thereafter, the shoulders on the ring are aligned with the spacings in the port, and the ring is shoved toward the body. When the shoulders on the ring pass beyond the rear walls, the ring is rotated by the desired amount, in this case 90°, and the connection is made.

It will be noted that all the parts are readily cast and made out of optimum materials for their respective intended purpose. It will also be noted that a strong connection is made, utilizing minimum interferences and lengths of materials.

It will further be understood that more than two segments may be provided, but inasmuch as two is the minimum number for the purpose intended, and two will function well, then it follows that more segments than this are not likely to be desired, at least for pipes of relatively small outer diameter.

I claim:
1. In combination: a body with a port having an axis, a port wall, and a plurality of shoulders which are spaced apart angularly, and each of which has a rear wall facing axially into the port; a pipe having an internal passage and an exterior flange adapted to enter the port and fit within the port wall inwardly of the shoulders; a plurality of initially completely separate ring segments adapted to be assembled to form a complete ring having an axis, an axially-extending tongue and groove at both angularly separated edges of all said segments, which tongue and groove have a radial component, said segments being assembled on the pipe by laying them against the pipe, aligning respective pairs of tongues and grooves, and axially shifting the segments relative to each other to engage the tongues in respective grooves thereby to form a unitary ring completely encircling the pipe, a shoulder on each segment of angular extent no greater than the spacing between the shoulders on the body, the pipe being assembled to the body by inserting the same into the port, then passing the shoulders of the ring through the spacings, and then turning the ring so the ring shoulders engage the rear walls and are axially restrained thereby.

2. A combination according to claim 1 in which a restraint surface is formed in the port wall facing the rear walls, and is axially spaced therefrom by a distance substantially equal to the thickness of the shoulders on the ring segments.

3. A combination according to claim 1 in which a peripheral seal is disposed between the pipe and the port wall.

4. A combination according to claim 3 in which the radial component of one of the tongues of each segment is directed toward its respective segment.

5. A combination according to claim 4 in which the ring consists of two segments, the segments being identical.

6. A combination according to claim 5 in which a restraint surface is formed in the port wall facing the rear walls, and is axially spaced therefrom by a distance substantially equal to the thickness of the shoulders on the ring segments.

References Cited

UNITED STATES PATENTS

| | | | |
|---|---|---|---|
| 1,366,219 | 1/1921 | Sudekum | 277—199 |
| 1,853,411 | 4/1932 | Gentry et al. | 285—391 |
| 2,604,974 | 7/1952 | Daigle. | |
| 3,212,795 | 10/1965 | Helm et al. | 285—403 |

DAVID J. WILLIAMOWSKY, Primary Examiner

W. L. SHEDD, Assistant Examiner

U.S. Cl. X.R.

285—215, 358, 400, 419; 287—111